(12) United States Patent
Coates, Jr. et al.

(10) Patent No.: US 7,723,114 B1
(45) Date of Patent: May 25, 2010

(54) METHODS AND SYSTEMS FOR DETECTION OF RADIONUCLIDES

(75) Inventors: John T. Coates, Jr., Anderson, SC (US); Timothy A. DeVol, Clemson, SC (US)

(73) Assignee: Clemson University, Clemson, SC (US)

( * ) Notice: Subject to any disclaimer, the term of this patent is extended or adjusted under 35 U.S.C. 154(b) by 133 days.

(21) Appl. No.: 11/621,744

(22) Filed: Jan. 10, 2007

Related U.S. Application Data

(60) Provisional application No. 60/758,027, filed on Jan. 11, 2006.

(51) Int. Cl.
*C09K 11/06* (2006.01)
*C09K 11/00* (2006.01)

(52) U.S. Cl. ...................................................... 436/57

(58) Field of Classification Search ................... 436/57, 436/534; 250/364, 252.1; 252/301.17; 382/260
See application file for complete search history.

(56) References Cited

U.S. PATENT DOCUMENTS

| | | | |
|---|---|---|---|
| 4,127,499 A | | 11/1978 | Chen et al. |
| 4,381,921 A | * | 5/1983 | Pierce et al. ................. 436/535 |
| 4,568,649 A | | 2/1986 | Bertoglio-Matte |
| 4,574,072 A | | 3/1986 | Horowitz et al. |
| 4,835,107 A | | 5/1989 | Horowitz et al. |
| 4,916,320 A | * | 4/1990 | Wunderly et al. ......... 250/483.1 |
| 5,100,585 A | | 3/1992 | Horowitz et al. |
| 5,281,631 A | | 1/1994 | Horowitz et al. |
| 5,346,618 A | | 9/1994 | Horowitz et al. |
| 5,466,930 A | * | 11/1995 | Schlenoff ................. 250/252.1 |
| 5,603,834 A | | 2/1997 | Rogers et al. |
| 5,618,851 A | | 4/1997 | Trochimcznk et al. |
| 5,637,506 A | | 6/1997 | Goken et al. |
| 5,651,883 A | | 7/1997 | Horowitz et al. |
| 5,707,525 A | | 1/1998 | Rogers et al. |
| 6,107,098 A | | 8/2000 | Kalinich |
| 6,139,749 A | | 10/2000 | Goken et al. |
| 6,303,936 B1 | | 10/2001 | DeVol et al. |
| 6,792,159 B1 | * | 9/2004 | Aufrichtig et al. .......... 382/260 |

OTHER PUBLICATIONS

Mattingly, Colin D. et al, Membrane-based scintillation proximity assays I. Detection and quantification of 14 CO2, Journal of Membrane Science, 1995, 98, 275-280.*
Article—*Solid-Phase Extraction for the Separation of Actinides from Radioactive Waste*, Authors, S. Maischak, J. Fachinger—WM'01 Conference, Feb. 25-Mar. 1, 2001, Tucson, AZ.
Article—Ion Exchange Using a Scintillating Polymer with a Charged Surface, Authors, Ming Li and Joseph B. Schlenoff—Published 1994: *Anal. Chem.* 66, pp. 824-829.
Article—Radionuclide Sensors Based on Chemically Selective Scintillating Microsphere: Renewable Column Sensor for Analysis of $^{99}$Tc in Water, Authors, O. Egorov, S. Fiskum, M. O'Hara, and J. Grate—Published: 1999, *Anal. Chem.* 77, pp. 5420-5429.
Article—Influence of Radionuclide Adsorption on Detection Efficiency and Energy Resolution for Flow-Cell Radiation Detectors, Authors, T.A. DeVol, M.E. Keillor and L.W. Burggraf—Published, *IEEE Transactions on Nuclear Science*, vol. 43, No. 3 Jun. 1996.
Proceedings of the IAEA Symposium, Vienna, May 24-28, 1965- *Radioisotope Sample Measurement Techniques in Medicine and Biology*—Heimbuch, et al.
Article—The Analysis of Plutonium-241 in Urine, Author, J. Ludwick—Published *Health Physics* Pergamon Press1961, vol. 6, pp. 63-65.

* cited by examiner

*Primary Examiner*—Walter D Griffin
*Assistant Examiner*—Christine T Mui
(74) *Attorney, Agent, or Firm*—Dority & Manning, P.A.

(57) ABSTRACT

Disclosed are materials and systems useful in determining the existence of radionuclides in an aqueous sample. The materials provide the dual function of both extraction and scintillation to the systems. The systems can be both portable and simple to use, and as such can beneficially be utilized to determine presence and optionally concentration of radionuclide contamination in an aqueous sample at any desired location and according to a relatively simple process without the necessity of complicated sample handling techniques. The disclosed systems include a one-step process, providing simultaneous extraction and detection capability, and a two-step process, providing a first extraction step that can be carried out in a remote field location, followed by a second detection step that can be carried out in a different location.

12 Claims, 8 Drawing Sheets

METHODS AND SYSTEMS FOR DETECTION OF RADIONUCLIDES

PRIORITY INFORMATION

The present application claims priority to U.S. Provisional Patent Application Ser. No. 60/758,027 filed on Jan. 11, 2006, which is incorporated herein by reference in its entirety.

FEDERALLY SPONSORED RESEARCH AND DEVELOPMENT

The United States Government may have rights in this disclosure pursuant to U.S. Department of Energy Grant Number DE-FG07-99ER62888.

BACKGROUND

The presence of radioactive materials in water can come about due to the actions of mankind as well as acts of nature. For instance, while contamination of ground and surface waters can come about as a result of the release of radioactive material from various types of industrial and research facilities, in other cases, the presence of radioactive materials in ground or surface waters is due merely to the presence of these materials in the surrounding geological structures. Accordingly, examination of water for the presence of these contaminants is often desirable, even when the water may appear to originate from a pristine source.

Radiochemical analysis methods have been developed for determining the existence and level of such contamination. Current methods generally include multiple steps including an initial concentration step, in which the contaminants are removed from the sample, for example with an extraction medium, e.g., a chromatographic column or a filtration material, followed by purification of the contaminant and subsequent quantification of the radionuclide of interest. One example of such multi-step procedures is described in U.S. Pat. No. 6,126,901 to Patch, et al.

Researchers have also proposed methods for the direct determination of the presence of the radiochemicals while still on the extraction medium. For example concentration and direct detection of gamma-ray radiation on a column has been described (see, e.g., Link, J. M., *Analytical Chemistry*, 71 (1999) 2700-2707, and Headrick, J., *Analytical Chemistry*, 72 (2000) 1994-2000) as has concentration and direct detection of beta-particle radiation (see, e.g., Bosworth, N., *Nature*, 341 (1989) 167-168; Li, M., *Analytical Chemistry*, 66 (1994) 824-829, and U.S. Pat. No. 4,568,649 to Bertoglio-Matte). U.S. Pat. No. 6,303,936 to DeVol, et al. discloses an extraction-scintillation medium of substantially free-flowing, porous, solid particulate matter having one or more fluors retained within the particulate matter and an extraction agent adsorbed or otherwise bound to the surface of the particulate matter for the concentration and direct detection of, e.g., alpha-particle radiation. The devices of DeVol, et al. can be beneficially located in-line for monitoring the effluent from an industrial or research facility. U.S. Pat. No. 6,139,749 to Goken, et al. discloses a sorptive or reactive separator that can be incorporated in particulate form via embedding in a porous web or membrane or via attachment of the separator moiety to fibers of a fibrous matrix.

While the above described methods and materials describe certain advances in the art, room for improvement and further advances exist.

SUMMARY

In one embodiment disclosed is a radionuclide detection material. The material can include, for instance, a liquid impermeable substrate having a first surface and a second opposing surface. The liquid impermeable substrate can transmit photonic energy from the first surface to the second surface. In one embodiment, the substrate can transmit photonic energy of a predetermined wavelength. For instance, the substrate can transmit visible light.

The radionuclide detection material can also include a fluor. The fluor can be a component of the radionuclide detection material such that a photon emitted from the fluor can be transmitted to the second surface of the substrate. For instance, in one embodiment, the fluor can be contained within the impermeable substrate. In another embodiment, the fluor can be contained on the first surface of the substrate, for instance in a scintillator layer. The fluor can be a component of a scintillator. For instance, the radionuclide detection material can include p-terphenyl dissolved in a styrenic polymer thus forming a plastic scintillator.

The radionuclide detection material can also include an extraction agent confined on the first surface of the substrate. An extraction agent for use can preferentially bind one or more radionuclides. For instance, the detection material can include an extraction agent in an amount between about 2% and about 40% by weight of a fluor of the material. Optionally, the fluor can be a component of a scintillator and the detection material can include an extraction agent in an amount between about 2% and about 40% of a scintillator of the material. In one embodiment, an extraction agent can be confined on a carrier. For example, an extraction agent can be bound or adsorbed on a particulate or resin carrier. In one preferred embodiment, the extraction agent can be a diesterified methanediphosphonic acid.

In one embodiment, the extraction agent can be confined within a layer that can be adjacent to the first surface of the impermeable substrate. For instance, both the fluor and the extraction agent can be confined within a single layer that is adjacent to the first surface. In another embodiment, the detection material can include multiple layers. For instance, the fluor can be confined within a scintillator layer that can be adjacent to the first surface of the impermeable substrate, and the extraction agent can be confined within an extraction layer that can be adjacent to the scintillator layer.

In another embodiment, the disclosure is directed to a process for detecting the presence or amount of a radionuclide in a sample. For instance, a process can include contacting a first surface of a radionuclide detection material with an aqueous sample containing a radionuclide, binding the radionuclide to the extraction agent of the material, emitting a photon from the fluor or scintillator of the material in response to radiation emitted from the bound radionuclide (e.g., α-particle radiation or β-particle radiation), transmitting the photon from the second surface of the detection material, and detecting the photon.

A process can be a single step process, in which an emitted photon is detected while the aqueous sample is in contact with the first surface of the detection material. In another embodiment, a process can be a two step process in which following contact between the aqueous sample and the detection material, the detection material is separated from the aqueous sample and then, at a later time, the photonic emission is detected.

In yet another embodiment, disclosed is a system for carrying out a radionuclide detection process. For instance, a system can include a detection material such as described herein, a sample container that can be removably attached to the detection material, and a photon detector that can also be removable attached to the detection material. In one preferred embodiment, the system can be portable.

BRIEF DESCRIPTION OF THE FIGURES

A full and enabling disclosure, including the best mode, to one of ordinary skill in the art, is set forth more particularly in the remainder of the specification, including reference to the accompanying figures, in which.

Figure 1A:
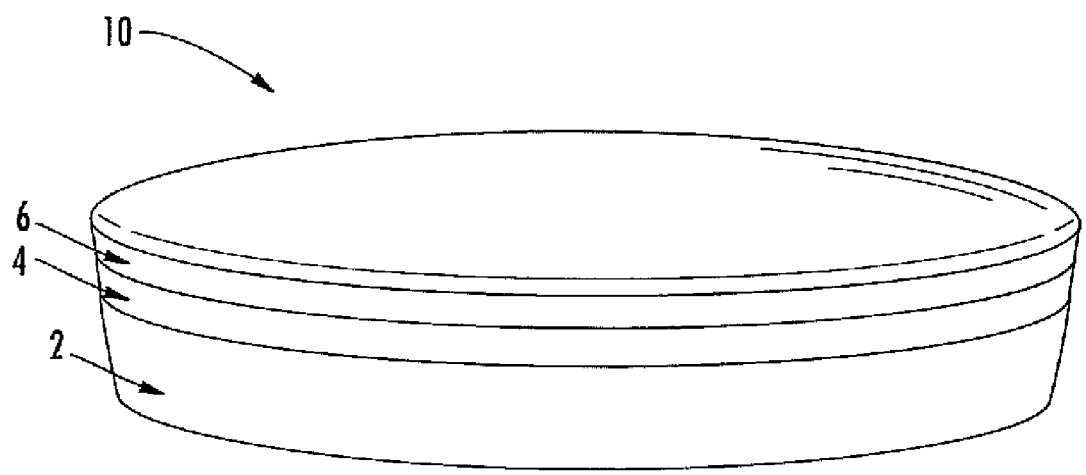
FIG. 1A is a schematic diagram of one embodiment of an extraction/scintillation material as disclosed herein.

Repeat use of reference characters in the present specification and drawings is intended to represent the same or analogous features or elements.

DETAILED DESCRIPTION OF
REPRESENTATIVE EMBODIMENTS

Reference will now be made in detail to various embodiments of the disclosed subject matter, one or more examples of which are set forth below. Each embodiment is provided by way of explanation, not limitation. In fact, it will be apparent to those skilled in the art that various modifications and variations may be made without departing from the scope or spirit of the disclosed subject matter. For instance, features illustrated or described as part of one embodiment, may be used with another embodiment to yield a still further embodiment.

DEFINITIONS

As utilized herein, the term 'fluor' generally refers to a compound that can dissipate energy via the emission of visible or near-visible photons.

As utilized herein, the term 'scintillator' generally refers to a substance, a compound, or a device that can absorb electromagnetic or charged particle radiation and fluoresce photons at a characteristic Stokes-shifted wavelength in response, thereby releasing the previously absorbed energy.

Accordingly, in certain instances, the terms 'fluor' and 'scintillator' can be synonymous. In other instances, however, the terms are not synonymous. For instance, the term 'scintillator' as used herein encompasses compositions and devices that include one or more fluors in addition to other compounds, materials, and/or components.

As used herein, the terms 'radionuclide detection material' and 'extraction/scintillation material' are used interchangeably and intended to be synonymous.

DETAILED DESCRIPTION

In general, the present disclosure is directed to materials and systems useful in determining the presence and optionally the concentration of radionuclides in a sample. The materials disclosed herein can provide the dual function of both extraction and scintillation. Moreover, the disclosed materials have been designed with ease of use and portability in mind. Accordingly, systems described herein can be both portable and simple to use, and as such can beneficially be utilized to determine presence and optionally concentration of radionuclide contamination in an aqueous sample at any desired location and according to a relatively simple process without the necessity of sample handling techniques such as column extraction and/or elution.

In general, extraction/scintillation materials as described herein are multi-component materials prepared in a multi-sided form, e.g., in the form of a relatively flat disk or plate. For instance, and with reference to FIG. 1A, one embodiment of an extraction/scintillation disk 10 is illustrated. As can be seen, disk 10 includes a substrate 2 that defines two opposing surfaces, e.g., a top surface and a bottom surface.

In general, substrate 2 is impermeable to liquids but can allow the transmittal of photonic energy across the substrate 2. For instance, in one embodiment, substrate 2 can be transparent to photonic energy. Complete transparency is not a requirement of the substrate 2, however, and in other embodiments, substrate 2 can be translucent to photonic energy. Accordingly, substrate 2 can be formed of any suitable material and to any convenient shape and size providing that some photonic energy incident to one side of substrate 2 can be transmitted from the second side of the substrate. For instance, substrate 2 can be flexible or inflexible, can be of any convenient thickness, and can be formed with any suitable geometric orientation. For example, substrate 2 can be formed in the shape of a flat circular disk, as shown in FIG. 1A, or in any other convenient shape.

Substrate 2 can be formed from any suitable material or combination of materials including natural and/or synthetic materials, crystalline and/or amorphous materials, and the like. For example, substrate 2 can include one or more translucent or transparent polymers such as, without limitation, methacrylates, including polymethyl methacrylates and methacrylate copolymers; polycarbonates; polyolefins including polyesters, polypropylenes, and cyclic polyolefins; styrenic polymers; polyvinyltoluenes; high refractive index polymers; fluorine-containing polymers; polyethersulfones; and polyimides. In other embodiments, substrate 2 can include an inorganic material such as a glass, a quartz, or a sapphire material.

Optionally, substrate 2 can be transparent to photonic energy falling only within a predetermined wavelength. For instance, substrate 2 can be transparent to visible light, and opaque to ultraviolet and/or infrared light. Accordingly, substrate 2 can be designed to transmit photonic energy, and in particular photonic energy released or emitted from a fluor/ scintillator, as described further below, and opaque to photonic energy of a different wavelength, thereby preventing the transmission of photonic energy that could detrimentally affect the accuracy of the disclosed system.

Referring again to FIG. 1A, in addition to the substrate 2, the disk 10 can include a scintillator layer 4 located at a first surface of the substrate 2 that can include one or more fluors.

Various fluors and scintillators as are generally known to one of ordinary skill in the art can be used in the disclosed materials. Representative fluors can be organic solid fluors such as benzoxazoles, oxazoles, oxadiazoles, terphenyls, polynuclear aromatics, pyrazolines, phosphoramides, and thiophenes, or they can be inorganic fluors having a crystal structure.

A non-limiting list of fluors and scintillators can include, for example, 1,1'-biphenyl 4-yl-6-phenyl-benzoxazole (TLA); 2-phenylbenzoxazole and derivatives thereof such as 2-(4'-Methylphenyl)-benzoxazole, 2-(4'-Methylphenyl)-5-methylbenzoxazole, 2-(4'-Methylphenyl)-5-t-butylbenzoxazole, 2-(4'-t-Butylphenyl)-benzoxazole, 2-Phenyl-5-t-butyl-benzoxazole, 2-(4'-t-Butylphenyl)-5-t-butylbenzoxazole, 2-(4'-Biphenylyl)-benzoxazole, 2-(4'-Biphenylyl)-5-t-butyl-benzoxazole, and 2-(4'-Biphenylyl)-6-phenyl-benzoxale (PBBO); Oxazoles such as 2-p-biphenylyl-5-phenyloxazole (BPO), 2,2'-p-phenylenebis (5-phenyloxazole) (POPOB), 2,5-diphenyloxazole (PPO, 1,4-bis-2-(5-phenyloxazol-2-yl) benzene (POPOP), 2-(1-napthyl)-5-phenyloxazole (α-NPO); Oxadiazoles including 2,5-diphenyloxadiazole (PPD) as well as derivatives of the 1,3,4-oxadiazoles including 2,5-Diphenyl-1,3,4-oxadiazole (PPD), 2-(4'-t-Butylphenyl)-5-phenyl-1,3,4-oxadiazole, 2,5-Di-(4-t-butylphenyl)-1,3,4-oxadiazole, 2-Phenyl-5-(4-biphenyl-1)-1,3,4-oxadiazole (PBD), 2-(4'-t-Butylphenyl)-5-(4"-biphenyl)-1)-1,3,4-oxadiazole (Butyl-PBD); Terphenyls including 4,4"-di-tert-amyl-p-terphenyl (DAT); Polynuclear aromatics including 4,4'-bis(2,5-dimethylstyryl) diphenyl (BDB), p-terphenyl; Pyrozolines including 1-phenyl-3-mesityl-2-pyrazoline (PMP), 1,5-diphenyl-3-(4-phenyl-1,3-butadienyl)-2-pyrazoline (DBP), 1,5-diphenyl-beta-styrylpyrazoline (DSP); Phosphoramides including anilinobis (1-aziridinyl) phosphine oxide (PDP); Thiophenes including derivatives of benzoxazalyl-thiophene such as 2,5-Bis-benzoxazolyl(2')-thiophene, 2,5-Bis-[5'-methylbenzoxazolyl(2')]-thiophene, 2,5-Bis-[4',5'-dimethylbenzoxazolyl (2')]-thiophene, 2,5-Bis-[4',5'-dimethylbenzoxazolyl (2')]-3,4-dimethylthiopene, 2,5-Bis-[5'-isopropylbenzoxazolyl (2')]-3,4-dimethylthiophene, 2-Benzoxazolyl (2')-5-[7'-secbutyl-benzoxazolyl(2')]-thiophene, 2-Benzoxazolyl(2')-5-[5'-t-butyl-benzoxazolyl (2')]-thiophene, 2,5-Bis-[5'-t-butylbenzoxazolyl(2')]-thiophene (BBOT); Fluorenes such as p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), and 7,7-diphenyl-9,9,9',9'-tetrapropy-2,2'-bifluorene ($PF_2$); sulfonated poly (styrene divinylbenzene); 1,4-bis(2-methylstyryl)benzene (bis-MSB); anthracene; stilbene; naphthalene; exemplary inorganic scintillators include inorganic crystal scintillators such as NaI(Tl), CsI(Tl), and undoped CsI, $BaF_2$, $CeF_3$, and BGO ($Bi_4Ge_3O_{12}$), ZnS(Ag), $CaF_2$ (Eu), LiF(Eu), and yttrium aluminate. Mixtures of fluors and scintillators are also encompassed in the disclosed materials and systems. In one preferred embodiment a silver-activated zinc sulfide can be utilized as the scintillator.

As can be seen with reference to FIG. 1A, in this particular embodiment, a fluor can be retained in a layer 4 applied to a surface of the substrate 2. Layer 4 can be retained on the substrate according to any method or device. Layer 4 can include one or more fluors as well as other materials that can enhance deposition and/or retention of the scintillator on the surface of the substrate. For instance, layer 4 can include binders or other materials. Additional materials of layer 4 should generally be provided such that they do not excessively impede transmission of the photonic energy emitted from the fluors. For instance they can be transparent or translucent or can be provided in a relatively low concentration level, so as to allow photonic energy emitted from the fluors to transmit across the substrate 2.

Figure 1B:
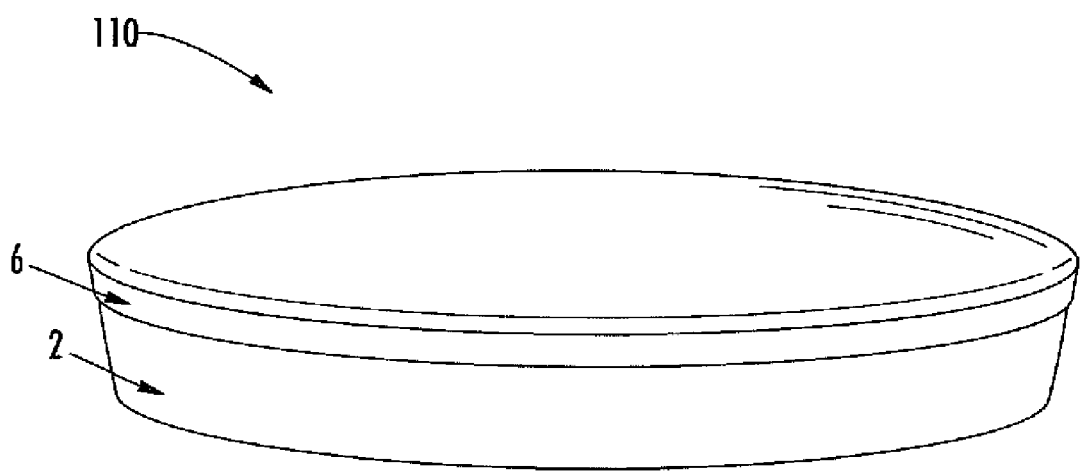
FIG. 1B is a schematic diagram of another embodiment of an extraction/scintiallation material as disclosed herein.

In another embodiment, fluors can be retained within an impermeable substrate. For example, in an embodiment schematically illustrate in FIG. 1B, a radionuclide detection material 110 can include a polymeric substrate 2 that can, for example be formed from long-chain polymer molecules bound to one another along the length of the molecular chains. In such an instance, fluors (not shown) can be retained within the molecular structure of the cross-linked polymer chains, for instance through polymerization and/or cross-linking of the polymer in the presence of the fluors. In another embodiment, fluors can be retained within pores defined by the body of the substrate 2, provided, of course, that the pores defined by the substrate body do not detrimentally affect the liquid impermeability of the substrate. Thus, fluors can be physically contained within a substrate 2 via physical entrapment or via bonding of the fluor to the polymer matrix.

For example, a suitable substrate 2, for instance a styrenic polymer substrate, can be impregnated or otherwise incorporated with a fluor such as p-terphenyl to provide an impermeable substrate 2 within which a fluor is retained. In another embodiment, the fluor can be a component of a scintillator, such as silver activated zinc sulfide scintillator, and the scintillator can be retained within a substrate, for instance a Mylar™ substrate.

Referring again to FIG. 1A, a scintillator layer 4 can be provided so as to ensure that photonic emissions can transmit to and ultimately across the substrate 2. For example, in one embodiment, when considering a scintillator such as silver activated zinc sulfide (ZnS:Ag) that can exhibit large self-absorption of the scintillator light, the maximum density thickness can be about 25 mg/cm². The preferred thickness of a scintillator layer 4 can generally vary depending upon the nature of the scintillator itself as well as the nature of the radiation to be detected by the system, as is well known to those of skill in the art.

The radionuclide detection material disclosed herein can be designed so as to detect any targeted radiation. For instance, the radionuclide detection materials disclosed herein can be utilized to detect charged-particle radiation, e.g., α-particle radiation, β-particle radiation, and/or electron radiation, as well as uncharged-particle radiation including electromagnetic radiation x-rays and γ-rays) and neutral particle radiation such as neutron radiation.

Moreover, the individual components of the detection material can be selected and tailored so as to preferentially detect a targeted type of radiation over others. For instance, when utilizing a silver activated zinc sulfide scintillator in a system designed to preferentially detect α-particle radiation over β-particle and γ-ray radiation, the scintillator layer can be relatively thin, as ZnS(Ag) is a scintillator that is particularly sensitive to alpha radiation. Through formation of a relatively thin ZnS(Ag) layer, little beta energy can be deposited in the ZnS(Ag) and even if some beta energy is deposited, the light generated from the beta energy is easily discriminated against the significantly greater amount of light produced from alpha radiation. Moreover, as the ZnS(Ag) layer is "thin" there is only a small probability that the gamma ray will interact in the material.

In another embodiment, when the selective detection of β-particle radiation is desired, an exemplary scintillator layer can be about 10 mm thick and can include a $CaF_2(Eu)$ scintillator. The thickness of the layer can be predetermined according to methods well known to those of skill in the art in order to keep the gamma-ray interaction probability low. For example, in this particular embodiment, $CaF_2(Eu)$ has a relatively low density and is composed of low atomic number elements, both of which translate into a low probability of interaction for gamma-rays.

Another exemplary scintillator layer for preferential detection of beta energy is a plastic scintillator (e.g. BC-400) provided in a scintillator layer of about 10 mm in thickness.

One example of a scintillator layer for preferential detection of γ-ray radiation is BGO provided in a layer of about 25 mm in thickness. BGO is a dense, and is composed of high atomic number elements, which when combined with the thickness will have a high probability of gamma-ray interaction and detection.

In addition to a liquid impermeable substrate and a fluor or scintillator, a radionuclide detection material can also include an extraction agent. For example, in the embodiment illustrated in FIG. 1A, the disk 10 can include an extraction layer 6 adjacent to the scintillator layer 4 that can include one or more extraction agents particular for the radionuclide of interest. For instance, the extraction agent can be adsorbed on or chemically bound to the device to form a layer 6 on the upper surface of the scintillation layer 4. In another embodiment, an extraction agent and scintillation materials can be mixed or otherwise combined and applied as a single layer on a surface of an impermeable substrate. Similarly, in the embodiment of the material 110 illustrated in FIG. 1B, in which fluors are contained within a substrate 2, e.g., within pores of a substrate or within a polymeric matrix forming a substrate, a layer 6 including extraction agents can be applied directly to a surface of the substrate 2, as illustrated.

Extraction agents can preferentially bind one or more targeted radionuclides according to any binding method as is generally known in the art. For example, an extraction agent can bind a targeted radionuclide via covalent, ionic, hydrogen or any other bond forming technique. In one embodiment, an extraction agent can bind a radionuclide via charge-charge interaction between the two. Extraction agents can be neutral, that is non-ionically charged at the pH value of use, or can be ionically charged, as desired.

In one embodiment, one or more agents of a group of neutral bifunctional organophosphorous compounds broadly described as alkyl(phenyl)-N-N-dialkylcarbamoylmethylphosphine oxide (CMPO) with a phase modifier such as tri-n-butyl phosphate (TBP) can be absorbed, adsorbed, coated on or otherwise applied to a surface of a detection material as an extraction agent. Such agents are capable of selectively extracting actinide metals from an aqueous sample, and particularly actinide metals in the, tri-, tetra- and hexavalent oxidation states, such as americium, curium, uranium, thorium, neptunium and plutonium. CMPO is an ionic charge-neutral agent that can be chemically bound to the surface of the disk. One particular embodiment utilizes an extraction agent of CMPO dissolved in TBP at about 0.75 M. A detailed description of this extractant is provided in U.S. Pat. No. 4,574,072 and No. 4,835,107 to Horwitz et al., the disclosures of which are each incorporated herein by reference. Resins including such extraction agents are available from Eichrom Technologies, Inc. of Darien, Ill., USA, under the trade name of TRU Resin.

Another ionic charge-neutral, surface adsorbed extraction agent that can be useful in the extraction of strontium from an aqueous solution is a dicyclohexano crown ether, such as dicyclohexano 18-crown-6, dicyclohexano 21-crown-7, and dicyclohexano 24-crown-8, and preferably, 4,4'(5') [(R,R') dicyclohexano]-18-crown-6, where R and R' are one or more members selected from the group of H and straight chain or branched alkyls containing 1 to 12 carbon atoms. One particular crown ether is bis-4,4'(5')[(t-butyl)cyclohexano]-18-crown-6 (DtBuCH18-C-6). These crown ethers have been observed to be particularly useful in the extraction of strontium when used in a concentration of about 0.1 to about 0.5 M, for instance about 0.2 M in a diluent of 1-octanol when the t-butyl form of the crown ether is used, and a concentration of about 0.25 to about 0.5 M when the hydrogen form is used. A more detailed discussion of these crown ethers and their use as extraction agents is provided in U.S. Pat. No. 5,100,585 and U.S. Pat. No. 5,346,618, both to Horwitz et al., the disclosures of which are each incorporated herein by reference. Resins including such extraction agents are available from Eichrom Technologies, Inc. of Darien, Ill., USA, under the trade name of Sr Resin.

Another extraction agent that can be utilized in the disclosed extraction/scintillation materials, for instance for the selective extraction of thorium, plutonium, uranium and/or americium, is a negatively charged, chemically bonded diphosphonic acid-based extractant, and preferably, a vinylidene or methylene diphosphonic acid-based agent. These types of agents are more fully described in U.S. Pat. No. 5,256,808 to Alexandratos, U.S. Pat. No. 5,281,631 to Horwitz, et al., and U.S. Pat. No. 5,618,851 to Trochimcznk, et al., the disclosures of which are each incorporated herein by reference. Exemplary resins including such extraction agents are those available under the trade name Diphonix™ from Eichrom Industries.

Still another extraction agent that can be utilized for the extraction of technetium and iodine is an agent that includes functional groups containing at least one poly(oxyethylene) chain $[(-CH_2CH_2O-)_n]$ having an average molecular weight of between about 700 and about 10,000, or between about 2,000 and about 5,000 in another embodiment.

More specifically, the extractant functional group corresponds to the formula:

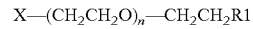

X—(CH$_2$CH$_2$O)$_n$—CH$_2$CH$_2$R1 where:

n is the number of ethyleneoxy repeating units, and is a number having an average value of about 15 to about 225, and in one embodiment about 40 to about 130, R1 is selected from the group of —OH, $C_1$-$C_{10}$ hydrocarbyl ether (alkoxy group) having a molecular weight of up to about one-tenth of the —(CH$_2$CH$_2$O)$_n$— portion, carboxylate, sulfonate, phosphonate and —NR2 R3 groups, where each of R2 and R3 is independently hydrogen, $C_1$-$C_6$ alkyl or $C_2$-$C_3$ hydroxyalkyl or NR2 and R3 together can form a 5- or 6-membered cyclic amine having zero or one oxygen atom or zero or one additional nitrogen atom in the ring, X is O, S, NH, or N—(CH$_2$CH$_2$O)$_m$—R4, wherein m has an average value of zero to about 225, and R4 is H, $C_1$-$C_2$ alkyl, 2-hydroxyethyl, or CH$_2$CH$_2$R1.

A more detailed discussion of this form of extractant is provided in U.S. Pat. Nos. 5,603,834 and 5,707,525, both to Rogers et al., the disclosures of which are incorporated herein by reference. An exemplary resin having this form of extractant bound thereto is ABEC™ brand resin, commercially available from Eichrom Technologies, Inc. According to one embodiment, the functional groups can be directly bound to the substrate surface. In other embodiments, the functional groups can be bound to a carrier that can then be applied to the disk 10. For example, the functional groups can be first bound to a carrier such as a translucent particulate carrier, and applied to the disk.

Still another exemplary extraction agent is a diesterified methanediphosphonic acid such as bis(2-ethylhexyl)methanediphosphonic acid in a diluent of methanol. This extraction agent can be useful in the extraction of actinide and lanthanide metals, and particularly those actinide and lanthanide metals in the tri-, tetra-and hexavalent oxidation states. The extractant can be adsorbed on the disk 10 and can be neutrally charged at low pH values of use and negatively charged at higher pH values of use. A more detailed discussion of this extractant and a resin made incorporating this extractant is provided in U.S. Pat. No. 5,651,883 to Horwitz et al., the disclosure of which is incorporated herein by reference. A resin having this extractant adsorbed thereon is commercially available from the Eichrom Technologies, Inc. under the trade name Dipex™.

The extraction agent can generally be provided in an amount to ensure a radionuclide can be extracted from an aqueous sample and concentrated on the disk such that radiation emitted from the radionuclide can be absorbed by the scintillator and reemitted therefrom as a detectable amount of photonic energy. Excessive amounts of the extraction agent are to be avoided in certain embodiments, so as to limit obstruction of the transfer of energy from the extracted radionuclide to the scintillator. For example, in the embodiment illustrated in FIGS. 1A and 1B, excessive amounts of extraction agent in layer 6, while providing for high extraction levels of a radionuclide from an aqueous sample, could inhibit energy transfer between a radionuclide and the scintillator in the layer 4 located beneath the layer 6 for certain types of radiation. For instance, excessive amounts of extraction agent in layer 6 could inhibit transfer of alpha particle radiation and beta particle radiation to the scintillator in layer 4.

While not wishing to be bound by any particular theory, it is believed that surface roughness of the material to which the extraction agent is to be applied may allow for the application of a sufficient amount of extraction agent to the surface so as to provide for suitably high extraction of an radionuclide without unduly inhibiting energy transfer between the radionuclide bound to the extraction agent in the extraction layer and the scintillator. For instance, in an embodiment wherein a fluor may be contained within an impermeable substrate, the substrate may have a surface roughness that can increase the effective surface area (i.e., the total area of a surface, including that of any microscopic surface undulations or other three dimensional formations existing on a surface) to which an extraction agent may be applied beyond that of the macroscopic surface area (i.e., the surface area obtained under the assumption that the surface is perfectly flat). Similarly, in an embodiment in which a scintillator layer is applied to a substrate surface prior to application of an extraction agent to the surface, the scintillator layer can describe a rough surface that can increase the effective surface area beyond that of the macroscopic surface area. Thus, an extraction layer formed on a rough surface can contain more extraction agent as compared to an extraction layer of the same thickness formed on a smooth surface.

In one embodiment, an extraction agent can be provided in an amount between about 2% and about 40% by weight of the fluor or scintillator component of the material. For example, the extraction agent can be provided in an amount between about 2% and about 10% by weight of the fluor or scintillator, for example between about 2.5% and about 4% by weight of the fluor or scintillator. In one embodiment, an extraction agent can be provided in an amount of up to about 15% by weight of the fluor or scintillator. In another embodiment, an extraction agent can be provided in an amount between about 1% and about 10% by weight of the fluor or scintillator, for instance between about 5 wt % and about 10 wt %.

Layers of the disclosed materials can be applied according to any suitable method. For example, in those embodiments in which the extraction agent and/or the scintillation agent can be adsorbed on to a surface of the substrate, the agent can be evaporated from solution following application of the solution to the disk via, e.g., a spin coating, dip coating, ink jet printing or other spray application process. In other embodiments, an agent can be applied to the disk according to a plasma deposition process or by a supercritical fluid process. Any other application method as is generally known in the art may be utilized for applying the agents to the disk, and any particular application method is not critical. Moreover, in some embodiments, the preferred application method can be dictated according to the characteristics of the substrate as well as the specific extraction agent and/or scintillator utilized, which can in turn depend upon the radionuclide to be targeted by the process.

Extraction/scintillation materials can be utilized to determine the presence and optionally the concentration of one or more radionuclides in an aqueous sample. Moreover, due to the beneficial design of the disclosed materials, methods and systems as disclosed herein can provide both simplicity and portability to a detection process.

It should be understood that while the final form of the sample during testing will be aqueous, the sample may be pretreated as necessary to provide the aqueous sample for testing. For example, a gaseous (e.g., atmospheric) sample can be collected with the aid of an impinger thus putting the atmospheric sample into an aqueous solution to which the disclosed processes can be applied. When considering an initially solid sample, the contaminant can be leached from the solid into an aqueous solution and the disclosed techniques applied. Alternatively for a solid sample, the sample can be completely digested thus putting the entire sample into an aqueous solution to which the disclosed techniques can be applied.

Figure 2:
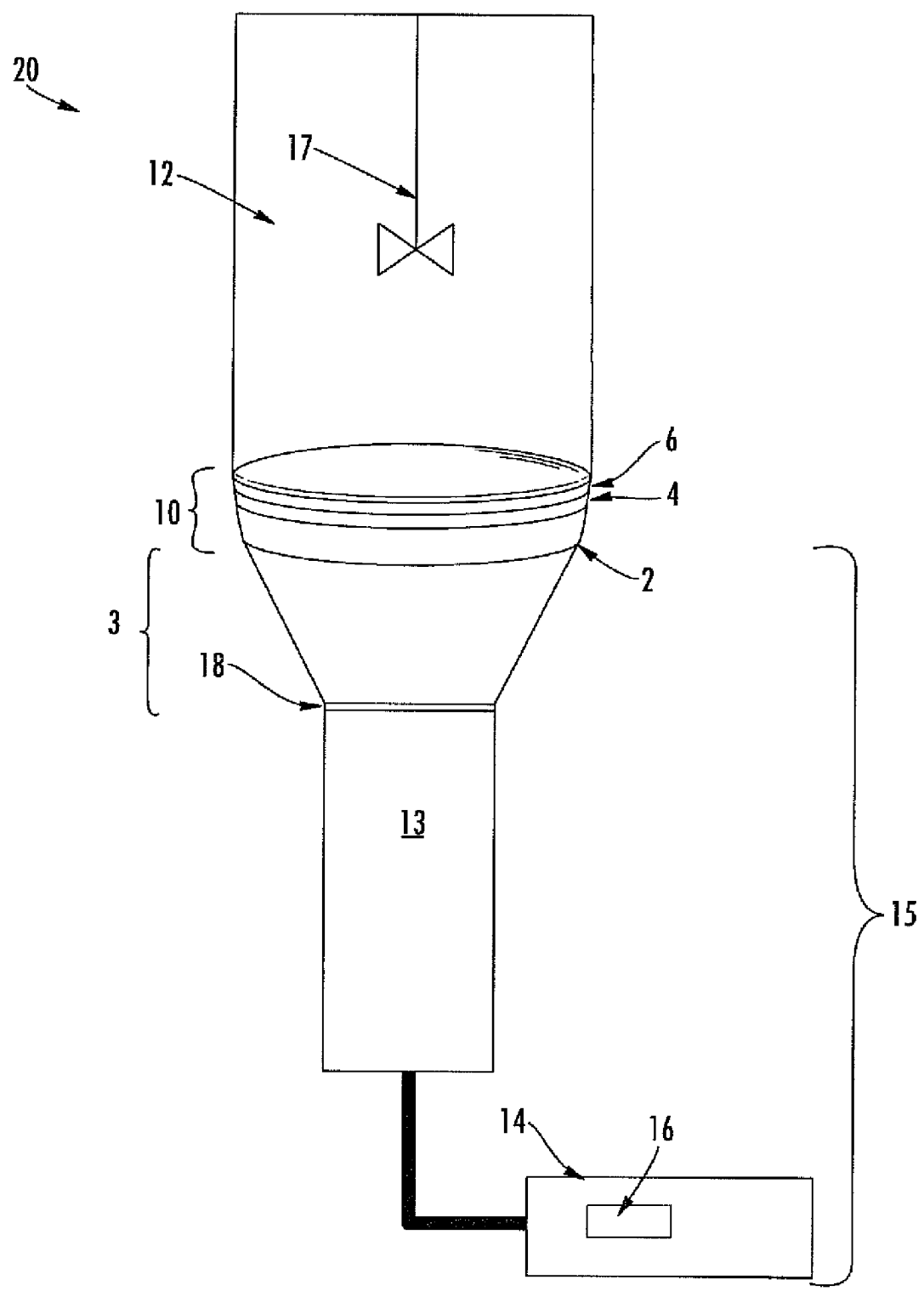
FIG. 2 is a schematic diagram of one embodiment of a system for examining an aqueous sample for the presence of radionuclides via a single-step extraction/detection regime.

One exemplary system 20 is schematically illustrated in FIG. 2. As can be seen, the illustrated system can include a disk 10 such as that described above, in communication with a detection system 15 for detecting photons emitted from the scintillator-containing layer 4 of the disk 10. For example, in the illustrated embodiment, the detection system 15 can include a photomultiplier tube (PMT) 13 in electrical communication with an analyzer 14 that can provide information via, e.g., a display field 16 that can display a reading such as counts per minute, so as to communicate the presence and/or concentration of the targeted radionuclide in an aqueous sample.

The detection system 15 can include any suitable photon detector as is generally known in the art. In particular, it should be understood that though the illustrated detection system 15 includes a photomultiplier tube 13 in electrical connection to analyzer 14 via a wired connection, this is not a requirement. In other embodiments, the detection system can include a photon detector and an analyzer in other orientations, for instance in a single unit or as separate units that can be placed in wireless communication with one another. Moreover, the detection system is not limited to the utilization of photomultiplier tubes, and in other embodiments other photon detectors such as photodiodes can be utilized. As such systems are well known to those of skill in the art, a detailed explanation of photonic detectors has not been included herein.

Referring again to FIG. 2, disk 10 can be placed in relationship to the photocathode 18 of PMT 13 so as to allow photons released from the scintillator-containing layer 4 to pass through the substrate 2 of the disk 10 and impinge upon the photocathode 18. Accordingly, disk 10 can be located at a distance from photocathode 18 so as to ensure good photon transmission. For example, in one embodiment, substrate 2 of disk 10 can be placed immediately adjacent to the entrance window that carries photocathode 18 of PMT 13. In other embodiments, however, substrate 2 can be placed on a light pipe 3 which is coupled to the entrance window of the photodetector. A light pipe 3, or any other means as is known in the art, can be useful to concentrate the scintillation light from a larger scintillator onto a smaller photodetector. If desired, an index of refraction-matched oil can be located between the substrate 2 and the entrance window of the PMT to enhance coupling of the substrate 2 to the photocathode 18.

As can be seen with reference to FIG. 2, disk 10 can be located at one side of a container 12, such that layer 6 containing the extraction agent is facing the interior of container 12. In one embodiment the surfaces of container 12 can be opaque, so as to limit the passage of photons from an external field into container 12. System 20 can also include an agitator 17, for instance an electrically, solar, or battery powered agitator that can extend into a liquid sample held in container 12 as illustrated. Any suitable system of agitation can optionally be utilized, however.

The volume of container 12 can be of any convenient size so as to contain an aqueous sample of interest. For example, in certain embodiments, the volume of container 12 can be quite small, for instance on the order of a few milliliters. In other embodiments, the volume of container 12 can be larger, for instance on the order of one liter, or even greater, if desired.

The preferred surface area of disk 10 can depend upon a combination of several different factors including, without limitation, the nature of the radionuclide in the sample (e.g., the expected concentration levels, the affinity of the radionuclide for the extraction agent, the pH of the sample, etc.), the expected volume of the sample to be examined, the amount of time desired to complete the examination, as well as the concentration of the extraction agent deposited on the disk 10. For example, in one embodiment, the macroscopic surface area of disk 10 can be quite small, for instance less than about 100 cm$^2$ and the system can determine the presence and concentration of radionuclides in an aqueous sample of up to about one liter in size in a process that can take about 2 hours. In one embodiment, the macroscopic surface area of disk 10 can be between about 10 cm$^2$ and about 200 cm$^2$ and the container 12 can have an internal volume of less than about 1 liter, such that the entire system 20 can be fairly small and easily portable. In other embodiments, however, the surface area of the disk 10 can be larger and/or the volume of the container 12 can be larger.

System 20 can be utilized to determine the presence and optionally the concentration of one or more radionuclides in a simple single-step process providing simultaneous sorption and detection of a radionuclide analyte in an aqueous sample. According to this embodiment, an aqueous sample can be located in container 12, and the sample can then be agitated such that the radionuclide of interest can contact the disk 10 and be extracted from the aqueous sample by the extraction agent of layer 6. As described above, the fluors of the scintillator are retained on or within the substrate 2 and the scintillator can be exposed to radiation emitted from the extracted radionuclide. Thus, upon extraction of the radionuclide, the fluors can emit photonic energy that can be detected by the detection system 15. In those embodiments in which the detection system has also been calibrated to determine the concentration of a particular radionuclide in an aqueous sample, a positive reading at the display field 16 can provide the user with not only a simple 'yes' or 'no' in regard to the presence of radionuclides in the aqueous sample, but can also provide information for determination of the concentration of the radionuclide in the sample.

It may be preferred in some embodiments to allow a time lag between the time of charging the aqueous sample to the container 12 and the time of taking a concentration reading at the display field 16, so as to allow the radionuclide and the extraction agent to equilibrate. For example, in one embodiment, equilibration can take place following about one hour of contact with agitation between the sample and the disk 10. Equilibration times for any particular embodiment can vary depending upon the surface area of the disk and the affinity of the radionuclide for the extraction agent, among other factors. Such equilibration determinations are well within the abilities of one of skill in the art, however, and as such are not discussed at length herein.

Figure 3A:
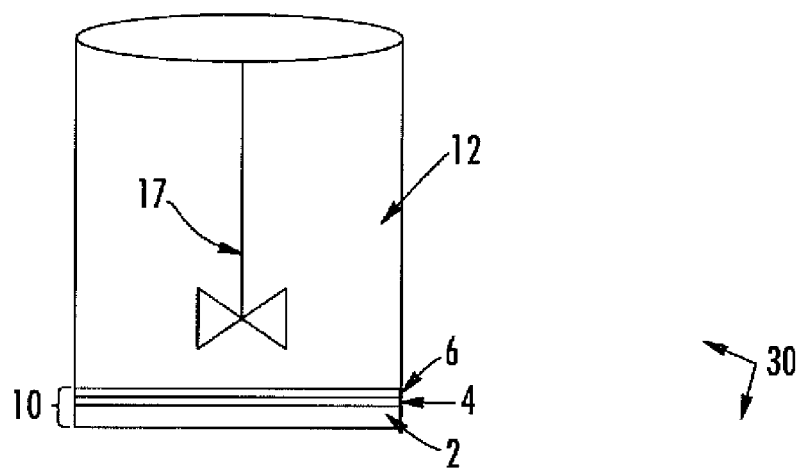
FIG. 3 is a schematic diagram of one embodiment of a system for examining an aqueous sample for the presence of radionuclides via a two-step extraction/detection regime including a first step (FIG. 3A) and a second step (FIG. 3B)

Another embodiment of a system 30 is schematically illustrated in FIG. 3. When utilizing this system, an aqueous sample can be examined for the presence and optionally also the concentration of radionuclides via a two-step process. In the first step of the process, illustrated at FIG. 3A, an aqueous sample can be located within container 12. Disk 10 can be attached to or contained within container 12 such that the extraction agent of disk 10 can contact the aqueous sample held in the container. For instance, disk 10 can be located at or near a surface of container 12 with layer 6 facing the interior of the container and the substrate 2 at the surface of container. In one embodiment disk 10 can be held within or can be an integral portion of a removable lid so as to be conveniently located at an interior surface of the container 12 upon attachment of the lid to the open end of the container.

After placing the aqueous sample in the container 12, the sample can be agitated, as with an agitator 17 that can be located within container 12. In other embodiments, however, the agitator can be an external agitator. For example container 12 can be placed on a shaker or agitator as is generally known in the art in order to agitate the aqueous sample held in the container 12. In any case, following a period of contact that generally can be carried out under agitation, the radionuclide of the sample and the extraction agent can equilibrate. Generally, equilibration can occur following a period of time of about one to about three hours. Particular equilibration times can vary however, as discussed above with reference to system 20. Following a period of agitation, the disk 10 can be removed from the container 12 and optionally stored and/or transferred to a secondary location prior to the second step of the process.

Figure 3B:
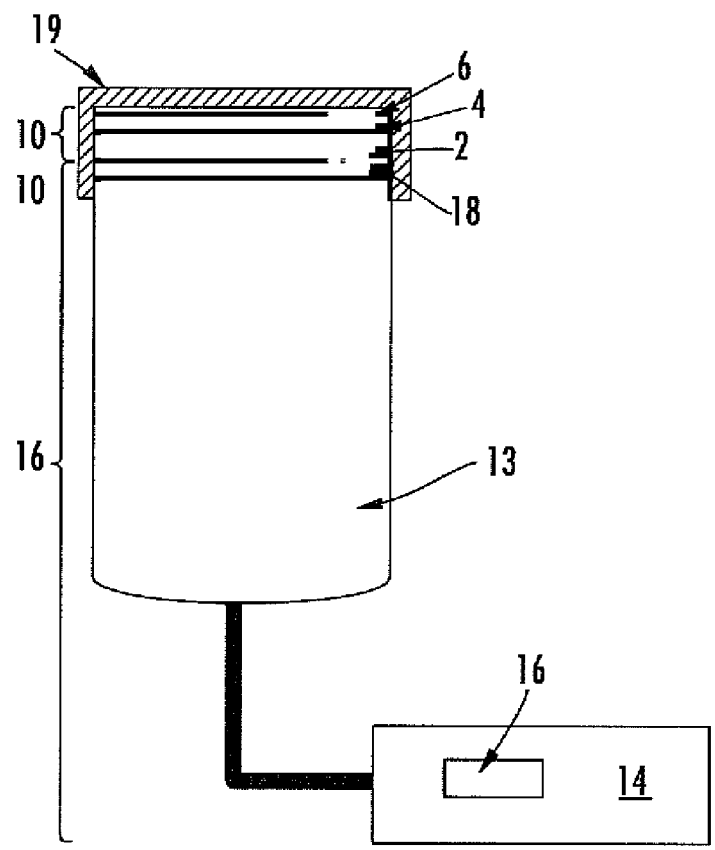

The second step of this embodiment is illustrated at FIG. 3B. As can be seen, during this phase of the process, the disk 10 can be placed in communication with a detection system 15, such as that described above. In particular, the disk 10 can be located with the substrate 2 adjacent to or near the photocathode 18 of the PMT 13 such that photons emitted from the scintillator of the disk 10 can be detected by the detection system 15. Detection and determination of the presence and optionally the concentration of an radionuclide on the disk, and hence in the original sample, can proceed according to the methods and devices of the particular detection system utilized. The system 30 will generally be operated with an opaque cover 19 in place that can prevent the passage of photons from an external field to the photo detector of detection system 15 during the detection step of the process.

The disclosed systems can be conveniently utilized to examine aqueous samples obtained at any location. In particular, as the disclosed systems can be portable, either the entire system, as with system 20 of FIG. 2, or a portion of the system, as with system 30 of FIG. 3, and in particular that portion illustrated in FIG. 3A, can be taken to any desired location for determination of radionuclide contamination at that site.

Systems as described herein can be utilized to examine ground and surface waters, and in one particular embodiment, to examine potential drinking water, for determination of radionuclide contamination. For example, according to current U.S. standards, the concentration of uranium in drinking water should be no greater than 30 micrograms per liter ($\mu$g/L). The presently disclosed materials can be taken to the source to examine water for such extremely low levels of contamination via the disclosed systems. The presently disclosed materials and systems can be utilized to detect uranium concentration as low as about 8 $\mu$g/L. In one embodiment, the disclosed methods and systems can quantify radionuclides in an aqueous sample at levels of about 0.5 bequerels per liter (Bq/L) within about one hour. Moreover, the disclosed systems are not only portable, but they can be simple to operate as compared to previously known systems.

The present disclosure may be better understood with reference to the following examples.

EXAMPLE 1

Scintillation disks including silver activated zinc sulfide (ZnS:Ag) on a Mylar® substrate were obtained from Rexon Components, Inc. of Beachwood, Ohio, USA. Scintillation disks utilized in the examples were circular and either 1.5 inches, 2 inches or 4 inches in diameter. Bis(2-ethylhexyl) methanediphosphonic acid ($H_2$DEH[MDP]), an extraction agent useful in the extraction of actinide and lanthanide metals, and particularly those actinide and lanthanide metals in the tri-, tetra-and hexavalent oxidation states, was obtained from Eichrom Technologies, Inc. of Darien, Ill., USA.

A solution of $H_2$DEH[MDP] was applied to the scintillation disks and on top of the ZnS:Ag layer at various weight percentages between 1.48% and 10.5% by weight of the disk. For application, a dilute solution of the extractant in tetrahydrofuran was deposited onto the disk using an air brush. Several passes in opposing directions were made and then allowed to dry. Coated disks were weighed and normalized to the weight of scintillator attached to the substrate. The process was repeated until the desired weight fraction of extractant to scintillator was achieved.

Water samples including known concentrations of uranium were prepared including 15 $\mu$g/L, 30 $\mu$g/L, 904/L and 7600 $\mu$g/L uranium, respectively. Teflon containers (50, 125, 250, 500, or 1000 ml) were washed and soaked for 4 hours in 0.1 N nitric acid.

Figure 4:
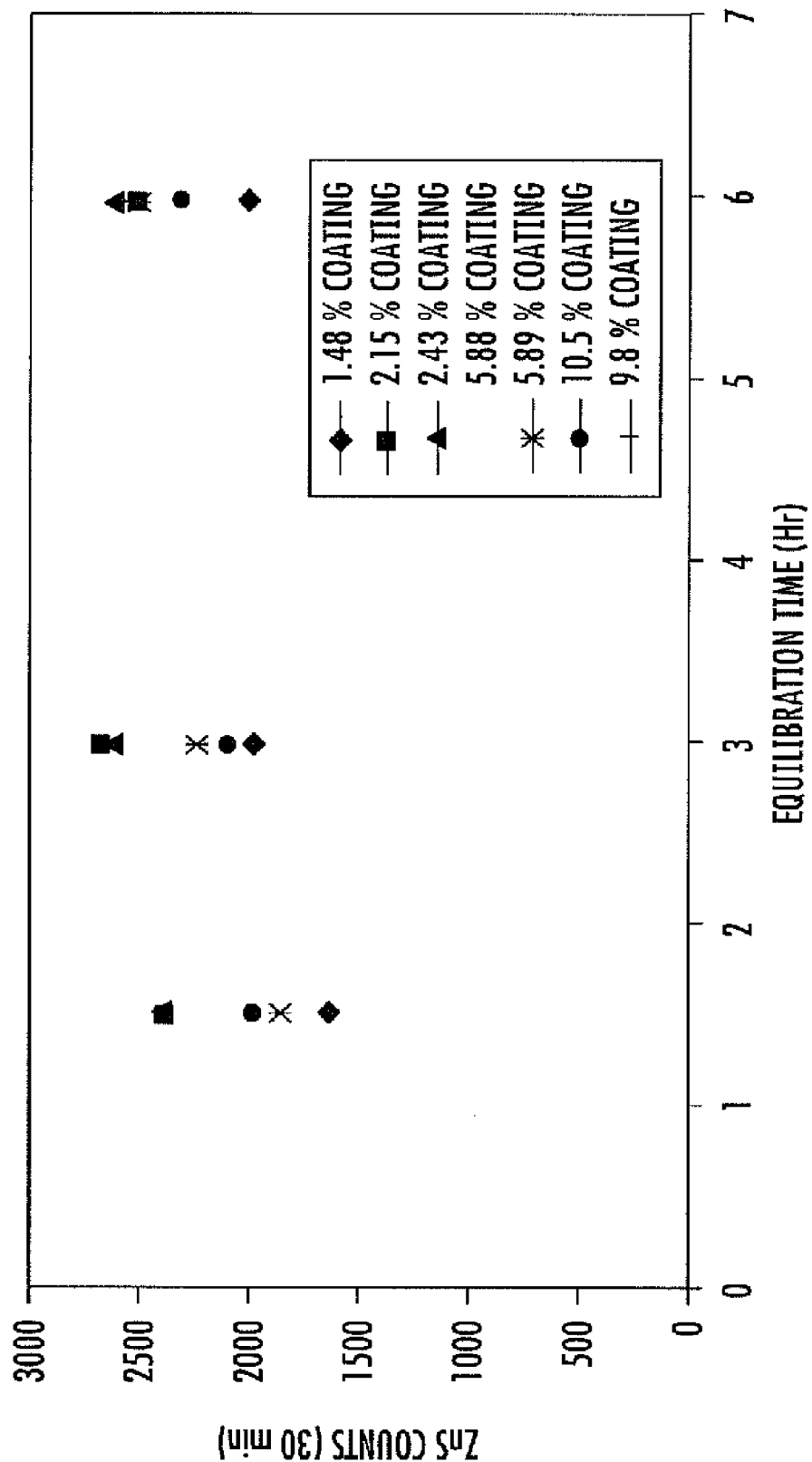
FIG. 4 illustrates adsorption equilibrium data for representative extraction/scintillation materials as described herein.

Natural groundwater containing uranium was placed in the Teflon containers under agitation and allowed to come to equilibrium with the prepared disks. The smaller containers were used to equilibrate the 1.5" and 2" disks and the larger containers were used to equilibrate the larger 4" disks. Adsorption equilibrium data is graphically illustrated in FIG. 4, and represents data for the 2" disks. Results were obtained with an instrument (Eberline E-600™ Survey Instrument available from Thermo Eberline of Sante Fe, N. Mex., USA) and are reported as counts per minute. As can be seen, in all cases the presence of the uranium in the water was detected and equilibration was attained within approximately three hours.

Figure 5:
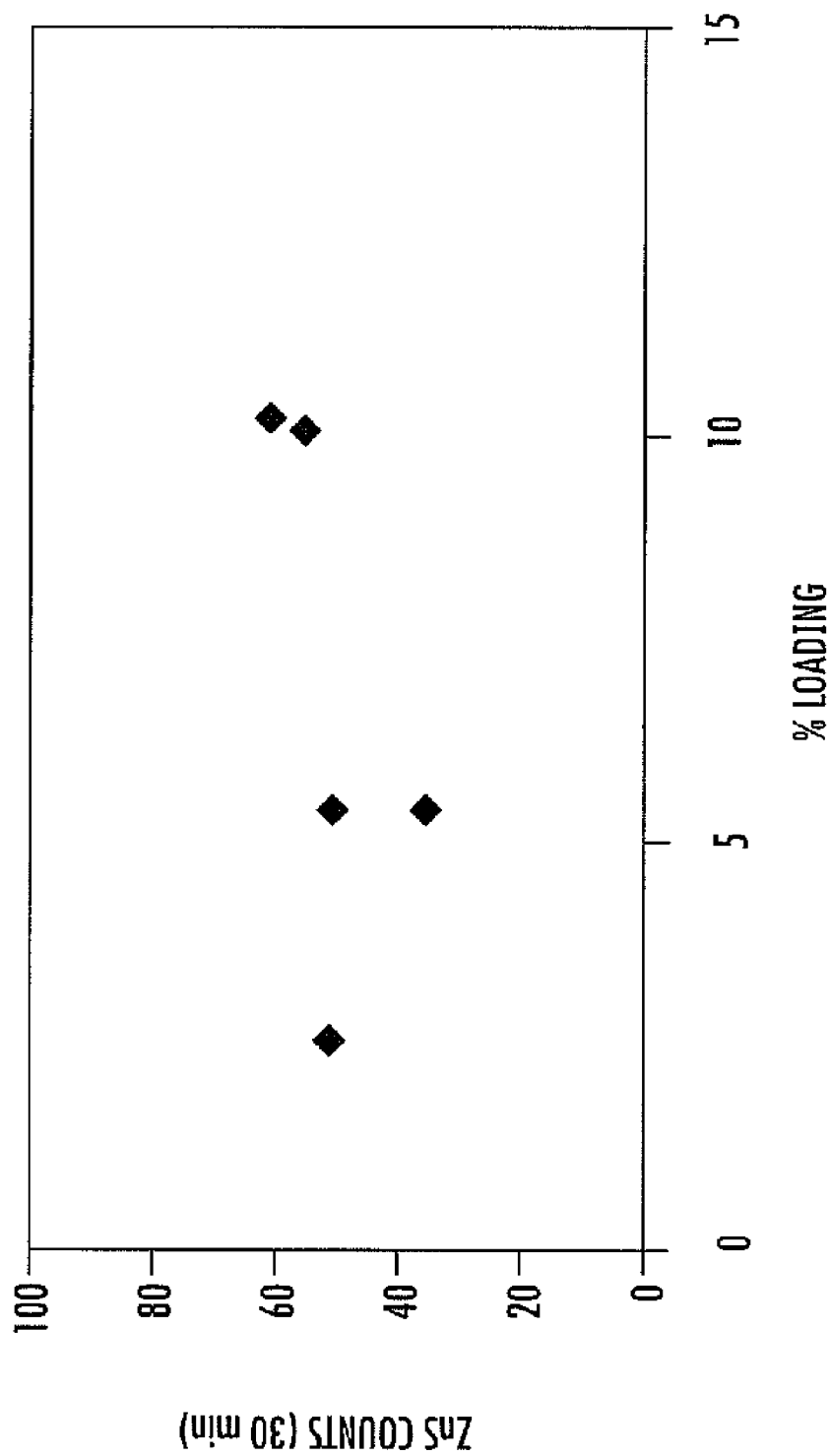
FIG. 5 graphically illustrates the measured count rate of a scintillator as a function of the loading level of the extraction agent by weight of the extraction/scintillation material during examination of a water sample contaminated with uranium at a concentration of 90 µg/L.

An extraction/scintillation disk having a 2 inch diameter was equilibrated under agitation for three hours in 100 mL water sample including 90 $\mu$g/L uranium and examined via the two step-process described above. FIG. 5 graphically illustrates the scintillator activity as a function of the loading level of the extraction agent for the aqueous sample including 90 $\mu$g/L uranium and examined via the two step-process.

Figure 6:
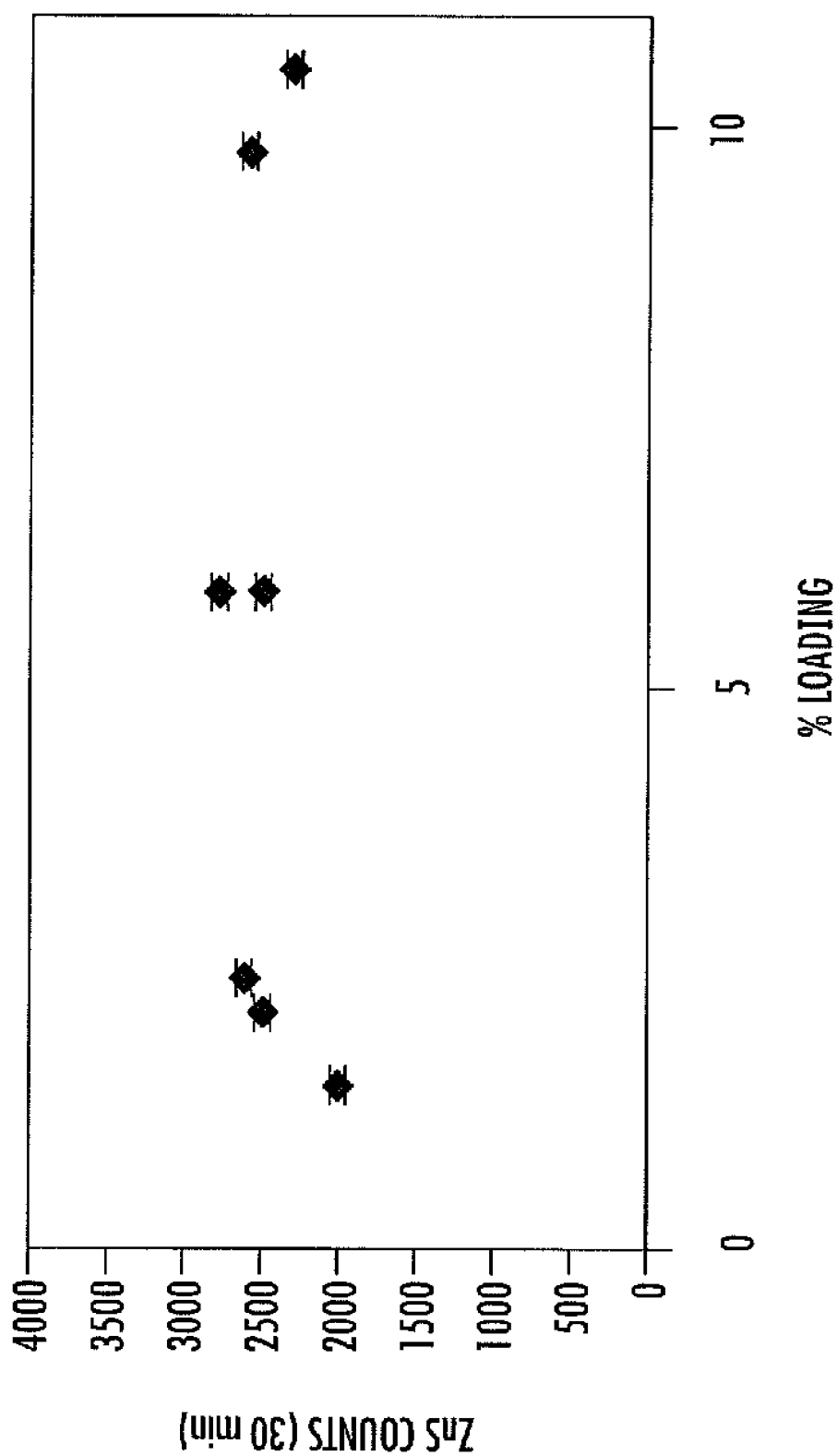
FIG. 6 graphically illustrates the measured count rate of a scintillator as a function of the loading level of the extraction agent by weight of the extraction/scintillation material obtained during examination of a water sample contaminated with uranium at a concentration of 7600 µg/L.

FIG. 6 graphically illustrates the scintillator activity for an extraction/scintillation disk having a 2 inch diameter as a function of the loading level of the extraction agent for an aqueous sample including 7600 $\mu$g/L uranium and examined via the two step-process.

Equilibration of a 1.5" disk with 100 mL of the 90 $\mu$g/L uranium solution was carried out. The disk was then examined according to both the one-step and the two-step processes. When utilizing the two-step process, the instrument measured 4.55 (s.d. 0.45) counts per minute (CPM). When utilizing the one-step process, the instrument measure 4.23 (s.d. 0.37) CPM. Thus, both methods provided statistically identical results.

EXAMPLE 2

Figure 7:
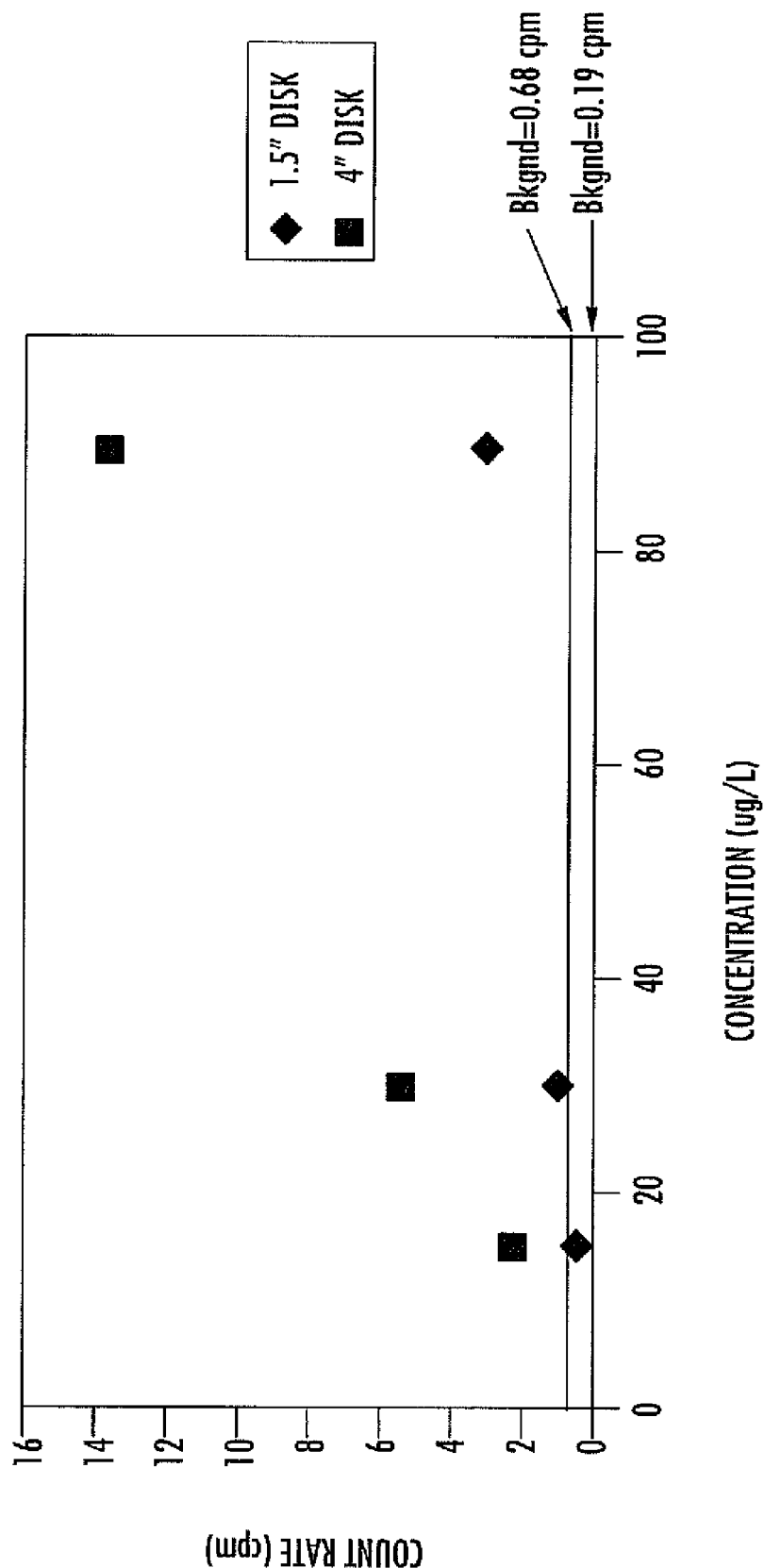
FIG. 7 illustrates calibration curves established for two different extraction/scintillation materials.

Calibration curves were created for the PMT analyzer via the two step method with water samples representing 15, 30 and 90 $\mu$g/L of uranium for both a 1.5 inch diameter extraction/scintillation disk and a 4 inch diameter extraction/scintillation disk prepared as described above in Example 1. Each disk included the $H_2$DEH[MDP] extraction agent applied at an amount of approximately 3% by weight of the ZnS:Ag scintillator. A portion of the calibration curves are shown in FIG. 7. The 1.5 inch disk was found to have a linear response to contamination between about 30 $\mu$g/L and about 90 $\mu$g/L. The 4 inch disks obtained results roughly 10 times the level of background detections at contamination levels of 15 $\mu$g/L and responded linearly to contamination levels up to about 700 $\mu$g/L.

Figure 8:
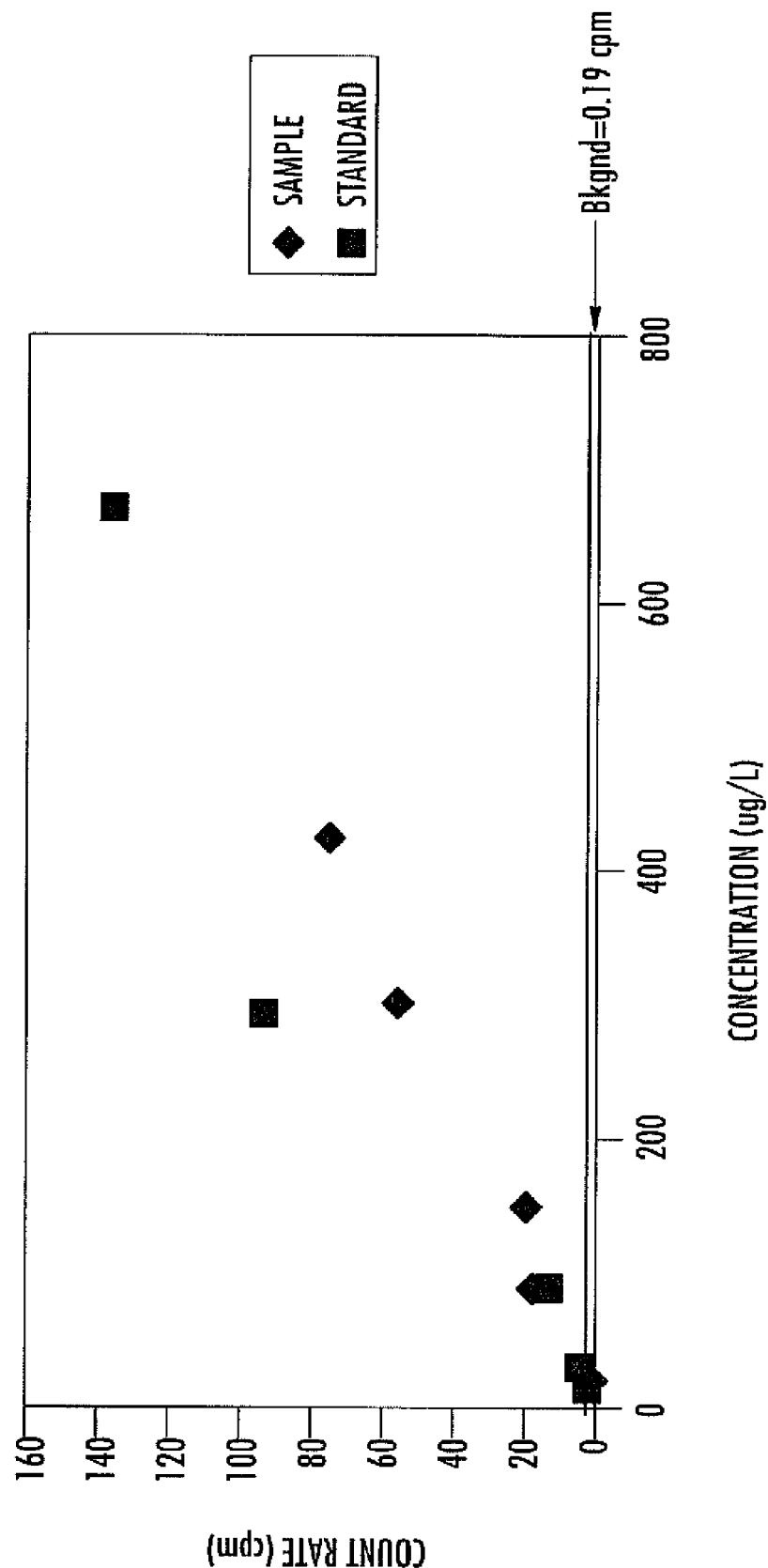
FIG. 8 illustrates results of analyses of several different groundwater samples utilizing systems as described herein.

Natural groundwater samples were obtained from Simpsonville, S.C. and analyzed via the two step method using the 4 inch disk with a uranium calibration curve. Results are shown in FIG. 8. These data represent a uranium calibration curve spanning a concentration range of approximately 15 to 700 $\mu$g/L concentrated onto 4" disks (the 'standard' data on FIG. 8) and samples collected from the field also sorbed onto 4" disks and subsequently analyzed by the two step method.

It will be appreciated that the foregoing examples, given for purposes of illustration, are not to be construed as limiting the scope of this disclosure. Although only a few exemplary embodiments have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A radionuclide detection material comprising:
a liquid impermeable substrate defining a first surface and a second opposing surface, wherein said substrate transmits photonic energy from the first surface to the second surface;
an inorganic fluor on the first surface of the liquid impermeable substrate or within the liquid impermeable substrate, wherein a photon emitted from said inorganic fluor is transmitted to said second surface; and
an extraction layer on said first surface, said extraction layer comprising an extraction agent that preferentially binds one or more radionuclides;
wherein said second surface is free of said extraction layer.

2. The radionuclide detection material of claim 1, wherein said inorganic fluor is within said liquid impermeable substrate.

3. The radionuclide detection material of claim 2, wherein said inorganic fluor is within pores of said liquid impermeable substrate.

4. The radionuclide detection material of claim 1, wherein said inorganic fluor is within a scintillator layer, said scintillator layer being between said first surface and said extraction layer.

5. The radionuclide detection material of claim 1, wherein said inorganic fluor is within said extraction layer.

6. The radionuclide detection material of claim 1, wherein said inorganic fluor is a component of a scintillator.

7. The radionuclide detection material of claim 6, wherein said radionuclide detection material comprises the extraction agent in an amount between about 2% and about 40% by weight of the scintillator.

8. The radionuclide detection material of claim 6, wherein the scintillator is silver activated zinc sulfide.

9. The radionuclide detection material of claim 1, wherein the substrate transmits photonic energy of a predetermined wavelength.

10. The radionuclide detection material of claim 1, wherein the material comprises the extraction agent in an amount between about 2% and about 40% by weight of the inorganic fluor.

11. The radionuclide detection material of claim 1, wherein the extraction agent is confined on a carrier.

12. The radionuclide detection material of claim 1, wherein the extraction agent is a diesterified methanediphosphonic acid.

* * * * *